3,397,155
POLYMERIZATION OF MONOEPOXIDES EMPLOYING HIGH SURFACE AREA PHOSPHATE CATALYSTS
Paul A. Naro, Pennington, and Robert D. Offenhauer, West Trenton, N.J., assignors to Mobil Oil Corporation, a corporation of New York
No Drawing. Continuation-in-part of applications Ser. No. 164,391, Jan. 4, 1962, and Ser. No. 225,387, Sept. 21, 1962. This application Aug. 26, 1965, Ser. No. 482,930
The portion of the term of the patent subsequent to Feb. 22, 1983, has been disclaimed
12 Claims. (Cl. 260—2)

This application is a continuation-in-part of our copending applications Ser. No. 164,391, filed Jan. 4, 1962, now abandoned and Ser. No. 225,387, filed Sept. 21, 1962, now Patent No. 3,236,785.

This invention relates to a process for the catalytic polymerization of epoxide compounds. More particularly, this invention relates to the process for polymerizing vicinal epoxide compounds in the presence of a catalytic amount of a high surface area metal phosphate catalyst, hereinafter described, to produce solid polymers.

The polymerization of vicinal epoxide compounds is known in the art wherein various polymerization catalyst systems are utilized. The difficulty which arises in the epoxide polymerization process relates to the selectivity of the types of catalysts which are used. Many known polymerization catalysts will not effectively polymerize vicinal epoxide compounds, in particular propylene oxide, to solid polymers. For example, boron trifluoride will not effectively polymerize propylene oxide to form a solid polymer but will readily polymerize other vicinal epoxide compounds such as ethylene oxide, isobutylene oxide, among others, to form solid polymers. Propylene oxide, on the other hand, is known to polymerize rapidly in the presence of alkalies and acids and even explosively with a Friedel-Crafts catalyst such as stannic chloride, but the products are generally viscous liquids of a low degree of polymerization. There are, however, various catalysts such as ferric hydroxide, stannous organic acid salts, among others, which are known to polymerize vicinal epoxide compounds including propylene oxide to solid polymers. It is the principal object of this invention to provide an additional and novel process for the catalytic polymerization of vicinal epoxide compounds, including propylene oxide, epichlorohydrin and mixtures thereof, to form solid polymeric materials utilizing catalytic quantities of specific high surface area metal phosphate compounds.

In a broad aspect, a process for the catalytic polymerization of vicinal epoxide compounds to form solid homopolymers or solid copolymers thereof has been discovered which comprises contacting the vicinal epoxide compounds with a metal phosphate prepared by reacting orthophosphoric acid, pyrophosphoric acid or diammonium hydrogen phosphate with a metal halide wherein the metal portion is selected from the group consisting of Group III–A of the Periodic Table of Mendeleev which includes boron, aluminum, gallium, indium and thallium. The reaction temperatures for the polymerization are maintained in the range from about 20° C. to about 150° C. for a sufficient period of time to polymerize the vicinal epoxide compound. More specific aspects of the invention relate to the preparation of homopolymers of epihalohydrins having a high degree of crystallinity and to the preparation of rubbery interpolymers or copolymers of epihalohydrins and propylene oxide.

It should be noted at this time that the expression "vicinal epoxide compound" as used herein including the appended claims, refers to polymerizable monoepoxide monomers, i.e., those containing a single epoxy group, wherein the oxygen atom is bonded to vicinal carbon atoms, i.e.,

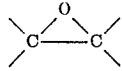

and the remaining portion of the compound is free from unsaturation other than aromatic unsaturation.

The vicinal epoxide compounds which can be polymerized to solid homopolymers in the process of this invention can be characterized by the following structure:

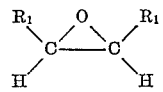

wherein each $R_1$, individually, can represent hydrogen, haloalkyl, haloaryl or a hydrocarbon radical free from unsaturation other than aromatic unsaturation, for example, alkyl, aryl, cycloalkyl, aralkyl and the like. Illustrative $R_1$ radicals include methyl, ethyl, propyl, butyl, isobutyl, hexyl, dodecyl, octadecyl, phenyl, chlorophenyl, bromobenzyl, tolyl, ethylphenyl, cyclopentyl, cyclohexyl, and the like. In addition, $R_1$ variables collectively can represent a divalent saturated aliphatic hydrocarbon radical to form with the two vicinal carbon atoms a cycloaliphatic hydrocarbon epoxide compound preferably containing from 4 to 10 carbon atoms which includes: epoxycycloalkane; alkyl-substituted epoxycycloalkane, epoxycyclobutane, epoxycyclopentane, epoxycyclohexane, epoxycycloheptene, epoxycyclooctane, methyl epoxycyclopentane, ethyl epoxycyclohexane, and the like. Other vicinal epoxide compounds which can be employed include the lower epoxide compounds, i.e., a lower alkylene oxide as ethylene oxide, propylene oxide, butylene oxide, isobutylene oxide, the epoxypentanes, the epoxyhexanes and epihalohydrins such as epichlorohydrin which is preferred, epifluorohydrin, and epibromohydrin. Other suitable compounds include the epoxyoctanes, 5-butyl-3,4-epoxynonane, 1,2-epoxydodecane, 1,2-epoxyhexadecane, 4-cyclohexyl-2,3-epoxybutane, styrene oxide, chlorostyrene oxide, ethylstyrene oxide, and the like. The preferred epoxide compounds to be employed are the lower epoxide compounds containing no more than 6 carbon atoms.

In addition to the homopolymers above, copolymers of the various epoxide compounds, heretofore described, can be produced by the process of this invention. It is preferred, however, in the production of copolymers to utilize the lower epoxide compounds or admixture thereof, alone or with other epoxide compounds, in weight ratios of about 1:10 to 10:1. Particularly preferred copolymers are rubbery copolymers of an epihalohydrin and a lower alkylene oxide (one containing no more than 6 carbon atoms), e.g., copolymers of epichlorohydrin and propylene oxide. Such copolymers exhibit a higher degree of flame resistance than olefin oxide polymers which do not contain halogen. These copolymers can be cross linked by such agents as hexamethylene diamine, sodium sulfide, dimercaptans and polyhydric alcohols, e.g., resorcinol and hydroquinone.

High surface area phosphates can be prepared by the reaction of orthophosphoric acid or diammonium hydrogen phosphate with an aqueous solution of a suitable Group III–A metal halide such as aluminum halide. The resulting product is neutralized and the gel formed is extracted with a suitable organic solvent, dried and calcined. The surface area of the phosphate product can range from about 75 to about 700 square meters per gram. It is preferable, however, to control the conditions of preparation to provide a phosphate which has a surface area in the range from about 275 to about 700 square meters per gram. The phosphates which have a surface area in excess of 275 square meters per gram have an exceptionally high polymerization activity for vicinal epoxides in the formation of solid polymers.

Suitable catalysts can also be prepared by reacting Group III-A metal halides with pyrophosphoric acid, and neutralizing and calcining the reaction product.

The catalysts concentrations used in accordance with the method of this invention can be varied over a broad range and can be selected on the basis of the rate of polymerization desired and the polymerization temperature to be used. In general, catalyst concentrations from about 0.005, or lower, to about 15 weight percent, or higher, preferably from about 0.1 to about 5 weight percent and usually at least 1 weight percent based on the weight of the vicinal epoxide compound used may be employed.

The temperature employed in the polymerization may vary over a considerable range depending upon the vicinal epoxide and catalyst being employed. In most cases, the temperature will vary from about 20° C. to about 150° C. referred temperatures range from about 70° C. to about 150° C. depending upon the monomer(s) and other factors. For example, employing benzene as a solvent, about 100° C. is a preferred temperature for the polymerization of propylene oxide or of propylene oxide with epichlorohydrin. However, unless the temperature is raised to about 130° C., and preferably 140° C., epichlorohydrin will not homopolymerize in benzene. If tetrahydrofuran is substituted as the solvent, polyepichlorohydrin can now be obtained at 100° C. Thus, the preferred temperature range for reactions involving epichlorohydrin is from about 90° C. to about 150° C. The period of time required for the polymerization reaction can range from several hours to as long as 30 days or longer, depending on the concentration of the catalyst, temperature, the particular catalyst employed, the epoxide compound to be polymerized and other factors. Atmospheric, superatmospheric, or subatmosphreic pressures may be utilized.

In the process of this invention, the polymerization may be carried out in solution, emulsion, suspension, and bulk systems. If solvents are employed, they can be solvents for the monomers and polymer or they can be solvents for the monomers and nonsolvents for the polymer. Examples of solvents useful in a solution polymerization include: acetone, diethyl ether, ethanol, ethylacetate, acetophenone, carbon tetrachloride, benzene, n-hexane, petroleum ether, diisopropyl ether, tetrahydrofuran, and the like. Tetrahydrofuran is useful in polymerizing epihalohydrins since it allows the reaction to be carried out at somewhat lower temperatures, and leads to an increase in molecular weight but at the expense of yield.

After the polymerization reaction is complete, the unreacted materials can be separated from the vicinal epoxide polymer by any suitable method such as solvent extraction, precipitation, distillation, filtration and the like. The polymer product can then be worked up in any suitable manner.

The polymeric materials that can be obtained by the practice of the invention are solid substances that have at least one and usually more of a variety of uses including the preparation of molds, films, fibers, coating applications, ion exchange resins, among others.

EXAMPLE 1

In a glass reactor, 160 parts of 85 percent phosphoric acid is slowly added to a rapidly stirred solution of 580 parts of hydrated aluminum chloride in 900 parts of water. After the addition of the phosphoric acid, the resultant solution is cooled in an ice bath, neutralized with ethylene oxide and allowed to warm to room temperature on standing overnight. The gel which is formed is broken up and extracted with isopropanol to remove the water and other soluble material. After extraction, the product is air dried and then calcined at 600° C. for three hours. The resulting product is aluminum phosphate which has a surface area of 545 square meters per gram and contains 0.1 percent carbon.

EXAMPLE 2

In a glass reactor, 100 parts of freshly distilled propylene oxide and 2 parts of aluminum phosphate having a surface area of 545 square meters per gram are heated with stirring at 115° C. for 22 hours. From the resulting product the unpolymerized material is removed using a benzene freeze-dry procedure. There is obtained 57 parts of a white, solid polymer of intrinsic viscosity of 0.85 measured in benzene.

EXAMPLE 3

In a glass reactor, 77 parts of ethylene oxide and 1.6 parts of aluminum phosphate having a surface area of 545 square meters per gram is heated with stirring to 65° C. After a short induction period, an exothermic reaction follows as indicated by a rise in temperature and pressure. When the reaction has subsided, the temperature is held at 65° C. for 40 hours with stirring. From the resulting product, the unpolymerized material is removed using a benzene freeze-dry procedure. There is obtained 63 parts of a hard solid polymer having an intrinsic viscosity of 0.76 measured in benzene.

EXAMPLE 4

In a glass reactor, 50 parts of freshly distilled propylene oxide, 200 parts of anhydrous benzene and 2 parts of aluminum phosphate having a surface area of 545 square meters per gram are heated with stirring to 100° C. for 116 hours. From the resulting product the unpolymerized material is removed using a benzene freeze-dry procedure. There is obtained 27 parts of a white, solid polymer of intrinsic viscosity of 0.4 measured in benzene.

EXAMPLE 5

In a glass reactor, 50 parts of freshly distilled propylene oxide, 200 parts of anhydrous acetone and 1 part of aluminum phosphate having a surface area of 545 square meters per gram are heated with stirring to 80° C. for 66 hours. From the resulting product the unpolymerized material is removed using a benzene freeze-dry procedure. There is obtained 14 parts of a white, solid polymer of intrinsic viscosity of 0.7 measured in benzene.

EXAMPLE 6

In a glass reactor, 50 parts of freshly distilled propylene oxide, 50 parts of ethylene oxide and 2 parts of aluminum phosphate having a surface area of 545 square meters per gram are heated with stirring to 80° C. for 60 hours. From the resulting product the unpolymerized material is removed using a benzene freeze-dry procedure. There is obtained 82 parts of a white, solid polymer.

EXAMPLE 7

In a glass reactor, 50 parts of freshly distilled propylene oxide and 1 part of a commercially available aluminum phosphate having a surface area of 15 square meters per gram are heated with stirring to 80° C. for 138 hours. There is obtained no solid polymer in this reaction.

EXAMPLE 8

Another sample of catalyst was prepared according to the following procedure. To a rapidly stirred solution of 116 g. of aluminum chloride hexahydrate in 180 ml. of water was added 32 ml. of 85% orthophosphoric acid. The clear solution was cooled to 0° C. and treated with 113 ml. of liquid ethylene oxide to react with the hydrochloric acid (from the aluminum chloride) and to aid in gel formation. The temperature of the mixture was not allowed to exceed 5° C. during the addition. The cooling bath was removed, and while warming to room temperature, the mixture set to a stiff, white hydrogel. This was broken up with a spatula, exhaustively extracted with isopropanol to remove water, and dried under vacuum to a free-flowing powder. The catalyst was activated by calcining in air at 600° C. to 700° C. for 24 hours. A typical analysis:

|  | Found | Theoretical |
|---|---|---|
| Aluminum, Wt. percent | 20.4 | 22.1 |
| Phosphorus | 24.2 | 25.4 |
| Carbon | 0.1 | 0 |
| Hydrogen | 0.7 | 0 |
| Surface Area, m.²/g | 424 |  |

EXAMPLE 9

A magnetically stirred Pyrex pressure reactor was flushed with dry $N_2$ and charged with 0.6575 g. of the catalyst of Example 8 and 32.87 g. epichlorohydrin (purified by washing with bisulfite solution and fractional distillation). The reactor was immersed in a thermostatted oil bath and stirred at 140° C. for 72 hours. A hard brown resin was formed, removed, broken up and refluxed overnight in 250 cc. of dioxane. The warm solution was poured into a liter of methanol to precipitate the polymer as a thick, fibrous mat. This was dissolved, reprecipitated, washed with methanol containing a few milligrams of Bisphenol A, and dried under vacuum overnight at 80° C. There was obtained 12.3 g. (38% yield) of a light tan polymer, M.P. 118° C., having an intrinsic viscosity of 1.2 (meaured in dioxane at 25° C). Elemental analysis:

|  | Theoretical percent | Found percent |
|---|---|---|
| Carbon | 38.9 | 38.6 |
| Hydrogen | 5.4 | 5.3 |
| Chloride | 38.3 | 37.3 |

Analysis by X-ray and by infra-red indicated that the product was polyepichlorohydrin.

EXAMPLES 10 TO 16

A series of reactions were run using 2% by weight of the aluminum phosphate catalyst of Example 8 and monomer mixtures as summarized in Table I. All reactions were run for 72 hours. Reduced viscosities were measured in dioxane at 25° C. The percentage compositions of the interpolymers were determined by chemical analysis. Unless otherwise indicated, the interpolymers were prepared by bulk polymerization.

TABLE I

| Ex. No. | Monomer Mixture | | Temp., ° C. | Yield, percent | Interpolymer | | Red |
|---|---|---|---|---|---|---|---|
|  | Wt. percent Propylene Oxide | Wt. percent Epichlorohydrin |  |  | Wt. percent Propylene Oxide | Wt. percent Epichlorohydrin |  |
| 10 | 88 | 12 | 100 | 76 | 85–88 | 12–15 | 1.4 |
| 11 | 75 | 25 | 100 | 65 | 76–77 | 23–24 | 0.3 |
| 12 | 75 | 25 | 100 | 66 | 77–82 | 18–23 | 0.3 |
| 13 | 20 | 80 | 100 | 35 | 32–41 | 59–68 | 0.2 |
| 14 | 25 | 75 | 100 | *19 | 49–51 | 49–51 | 1.0 |
| 15 | 25 | 75 | 100 | *18 | 45–47 | 53–55 | 1.1 |
| 16 | 20 | 80 | 140 | 63 | 23–31 | 69–77 | 0.5 |

*Reaction run in benzene solution.

EXAMPLE 17

A solution of 2.95 g. of polyepichlorohydrin and 0.5 g. of hexamethylene diamine in 150 ml. of dioxane was allowed to stand for three weeks, refluxed for three hours and filtered. The solid was extracted with methanol until no more colored material could be removed and then dried. There was obtained 0.6 g. of a very hard, insoluble, infusible resin. Elemental analysis indicated that the material was about 15% crosslinked.

EXAMPLE 18

Another sample of catalyst was prepared by adding pyrophosphoric acid to a rapidly stirred solution of a small molar excess of aluminum chloride hexahydrate in water. The solution was stirred, cooled, neutralized, extracted and dried as in Example 8. The dried product was calcined in nitrogen for 48 hours at 600° C. then in air for 8 hours at 600° C.

EXAMPLE 19

Epichlorohydrin was polymerized in bulk in the presence of 2 weight percent of the catalyst of Example 18 at 100° C. to a polymer having an $\eta$ of 0.45 in 9% yield.

EXAMPLE 20

A magnetically stirred Pyrex pressure reactor was charged with 16.3 g. freshly distilled and dried propylene oxide, 200 ml. dry benzene and 0.3260 g. (2%) of the aluminum phosphate of Example 8. After flushing with nitrogen, the reactor was immersed in a thermostatted oil bath and stirred for 72 hours at 100° C. The clear solution was centrifuged to remove catalyst and freeze dried to obtain 10.2 g. (63% yield) poly(propylene oxide) having reduced viscosity 3.7 (0.08 g./100 ml. at 30° C. in benzene). This corresponds to a molecular weight of about 330,000.

What is claimed is:

1. A process which comprises polymerizing a vicinal monoepoxide compound free from ethylenic and acetylenic unsaturation in the presence of from about 0.005 to about 15 weight percent, based on the weight of the monoepoxide compound, of a metal phosphate catalyst which has a surface area in excess of about 75 square meters per gram, wherein the metal portion of said metal phosphate is selected from the group consisting of boron, aluminum, gallium, indium and thallium, said metal phosphate being prepared by reacting a compound selected from the group consisting of orthophosphoric acid and diammonium hydrogen phosphate with a halide of said metal, neutralizing the reaction product, and drying and calcining the neutralized reaction product, at a polymerization temperature from about 20° C. to about 150° C., for a period of time sufficient to produce a solid polymer.

2. A process according to claim 1 wherein the metal is aluminum.

3. A process which comprises polymerizing an epihalohydrin in the presence of about 0.005 to about 15 weight percent based on the amount of monomer of a solid metal phosphate catalyst wherein the metal is selected from the group consisting of boron, aluminum, gallium, indium and thallium, the catalyst being prepared by reacting a compound selected from the group consisting of orthophosphoric acid and diammonium hydrogen phosphate with a halide of said metal, and drying and calcining to produce a catalytically active product; at a polymerization temperature from about 90° C. to about 150° C.; for a period of time sufficient to produce a solid polymer.

4. A process according to claim 3 wherein the polymerization is carried out in the presence of a solvent for the epihalohydrin.

5. A process according to claim 4 wherein the solvent is tetrahydrofuran.

6. A process which comprises copolymerizing epichlorohydrin with a lower alkylene vicinal monoepoxide in the presence of about 0.005 to about 15 weight percent based on the amount of monomer of a solid metal phosphate catalyst wherein the metal is selected from the group consisting of boron, aluminum, gallium, indium and thallium, the catalyst being prepared by reacting a compound selected from the group consisting of orthophosphoric acid and diammonium hydrogen phosphate with a halide of said metal, and drying and calcining to produce a catalytically active product; at a polymerization temperature from about 90° C. to about 150° C.; for a period of time sufficient to produce a solid polymer.

7. A process according to claim 6 wherein said metal is aluminum.

8. A process according to claim 6 further comprising crosslinking said solid polymer.

9. A process which comprises polymerizing a vicinal monoepoxide compound free from ethylenic and acetylenic unsaturation in the presence of from about 0.005 to about 15 weight percent, based on the weight of the monoepoxide compound, of a metal phosphate catalyst which has a surface area between about 275 to 600 square meters per gram, wherein the metal portion of said metal phosphate is selected from the group consisting of boron, aluminum, gallium, indium and thallium, the metal phosphate being prepared by reacting a halide of the metal with orthophosphoric acid, neutralizing the reaction product, and drying and calcining the neutralized reaction product, at a polymerization temperature from about 70° C. to about 150° C., for a period of time sufficient to produce a solid polymer.

10. A process which comprises polymerizing epichlorohydrin in the presence of from about 0.1 to 5.0 weight percent, based on the weight of the monomer content of a metal phosphate catalyst which has a surface area in excess of about 75 square meters per gram, wherein the metal portion of said metal phosphate is selected from the group consisting of boron, aluminum, gallium, indium, and thallium, the metal phosphate being prepared by reacting a halide of the metal with orthophosphoric acid, neutralizing the reaction product, and drying and calcining the neutralized reaction product, at a polymerization temperature from about 90° C. to about 150° C. for a period of time sufficient to produce a solid polymer.

11. A process which comprises copolymerizing a mixture of epichlorohydrin and propylene oxide in the presence of from about 0.1 to about 5.0 weight percent, based on the weight of said mixture of epoxide compounds, of an aluminum phosphate catalyst which has a surface area between about 75 to about 700 square meters per gram, the aluminum phosphate being prepared by reacting an aluminum halide with orthophosphoric acid, neutralizing the reaction product, at a polymerization temperature from about 90° C. to about 150° C., for a period of time sufficient to produce a solid polymer.

12. A process according to claim 8, wherein the crosslinking is carried out by contacting the polymer with an agent selected from the group consisting of hexamethylene diamine, sodium sulfide, a dimercaptan, and a polyhydric alcohol.

References Cited

UNITED STATES PATENTS

| | | | |
|---|---|---|---|
| 3,236,785 | 2/1966 | Naro et al. | 260—2 |
| 3,158,580 | 11/1964 | Vandenberg | 260—2 |
| 3,221,059 | 11/1965 | Fukui et al. | 260—2 |
| 3,135,705 | 6/1964 | Vandenberg | 260—2 |

FOREIGN PATENTS 594,025    3/1960    Canada.

WILLIAM H. SHORT, *Primary Examiner.*

T. E. PERTILLA, *Assistant Examiner.*

Disclaimer 3,397,155.—*Paul A. Naro*, Pennington, and *Robert D. Offenhauer*, West Trenton, N.J. POLYMERIZATION OF MONOEPOXIDES EMPLOYING HIGH SURFACE AREA PHOSPHATE CATALYSTS. Patent dated Aug. 13, 1968. Disclaimer filed Nov. 20, 1968, by the assignee, *Mobil Oil Corporation*.

Hereby disclaims the terminal portion of the term of the patent subsequent to Feb. 22, 1983.

[*Official Gazette April 1, 1969.*]